(12) United States Patent
Hobein et al.

(10) Patent No.: US 6,384,598 B1
(45) Date of Patent: May 7, 2002

(54) INDUCTIVE POSITION SENSOR HAVING MULTIPLE RECEIVING GEOMETRIES

(75) Inventors: Dirk Hobein; Henning Irle, both of Lippstadt; Norbert Kost, Geseke; Franz-Josef Schmidt, Salzkotten, all of (DE)

(73) Assignee: Hella KG Hueck & Co., Lippstadt (DE)

( * ) Notice: Subject to any disclaimer, the term of this patent is extended or adjusted under 35 U.S.C. 154(b) by 0 days.

(21) Appl. No.: 09/654,586

(22) Filed: Sep. 1, 2000

(30) Foreign Application Priority Data

Sep. 1, 1999 (DE) .......................... 199 41 464

(51) Int. Cl.$^7$ .............................. G01B 7/14; H01F 5/00
(52) U.S. Cl. ................ 324/207.17; 318/654; 318/660; 324/207.25
(58) Field of Search ................ 324/207.17, 207.25, 324/207.12; 336/120, 123, 200; 318/661, 660, 653, 654

(56) References Cited

U.S. PATENT DOCUMENTS

| 4,255,682 | A | | 3/1981 | Toida et al. |
| 4,893,078 | A | | 1/1990 | Auchterlonie |
| 4,918,997 | A | | 4/1990 | Pouillange |
| 5,239,288 | A | * | 8/1993 | Tsals ........................... 336/120 |
| 5,406,155 | A | * | 4/1995 | Persson .................... 310/68 B |
| 5,642,044 | A | | 6/1997 | Weber |
| 5,903,205 | A | | 5/1999 | Goto et al. |

FOREIGN PATENT DOCUMENTS

| DE | A1-4232993 | 4/1994 |
| EP | 0795738 | 9/1997 |
| EP | A2845659 | 6/1998 |
| FR | 2182400 | 7/1973 |
| GB | 1585745 | 3/1981 |
| WO | A1-9961868 | 12/1999 |

* cited by examiner

*Primary Examiner*—Jay Patidar
*Assistant Examiner*—Subhash Zaveri
(74) *Attorney, Agent, or Firm*—Birch, Stewart, Kolasch & Birch

(57) ABSTRACT

Described is an inductive position sensor, in particular for a motor vehicle, which has an oscillator circuit that generates a periodic alternating voltage signal and couples into an exciting coil, several receiving coils each of which forms a periodically repeating lap winding structure and whose overall arrangement forms a receiving geometry, an evaluation circuit for evaluating the signals induced in the receiving coils, and a movable inductive coupling element which influences the strength of the inductive coupling between the excitation coil and the receiving coils. The position sensor exhibits two receiving geometries and two coupling elements, the periodicity of the loop structures of the receiving coils is different in the two receiving coils, and over the total measuring range of the position sensor the numbers of periodic repetitions in the lap winding structures of the receiving coils of the two receiving geometries exhibit a non-integer ratio in relation to one another.

6 Claims, 2 Drawing Sheets

INDUCTIVE POSITION SENSOR HAVING MULTIPLE RECEIVING GEOMETRIES

BACKGROUND OF THE INVENTION

This application claims a priority based on German application 199 41 464.5 filed Sep. 1, 1999, and the contents of that application are incorporated herein by reference.

1. Field of the Invention

The present invention relates to inductive position sensors, in particular, to inductive position sensors for motor vehicles

2. Related Art

A known inductive position sensor generates a periodic alternating voltage signal and has, an exciting coil into which this signal is coupled, several receiving coils each of which forms a periodically repeating loop winding structure and whose combined arrangement forms a receiving geometry, an evaluation circuit for evaluating the signals induced in the receiving coils, and a movable inductive coupling element which influences the strength of the inductive coupling between the exciting coil and the receiving coils. Such a position sensor is described in undisclosed patent application DE 199 17 240.

For various applications, where position sensors are used, strict requirements are placed on accuracy and resolution in the acquisition of angles or displacements.

The position sensor disclosed in patent application DE 199 17 240 teaches a position sensor having an accuracy limit at approximately 0.2% accuracy. Using the same sensor principle, an improvement by a factor of 10 is set as an aim. One possible way to increase accuracy is to use the vernier principle that is generally known from measuring technology. For inductive sensors this requires, in principle, two separate sensors constructed with different and independent components.

SUMMARY OF THE INVENTION

It is an object of the invention to provide an inductive position sensor, which allows a particularly accurate acquisition of angles or displacements in an uncomplicated and inexpensive way.

The invention achieves this object in that the position sensor exhibits two receiving geometries and two coupling elements, in that the periodicity of the loop winding structures of the receiving coils is different in the two receiving geometries, and in that over the total measuring range of the position sensor the numbers of periodic repetitions in the loop winding structures of the receiving coils of the two receiving geometries exhibit a non-integer ratio in relation to one another.

Advantageously, the constructions and other embodiments of the present invention also permit the absolute acquisition of angles >360° and additionally also acquisition of torque.

The functional principle and embodiments of the inductive position sensor of the present invention are illustrated using drawings, and its method of functioning is explained in more detail. The principles presented for angle sensors are equally applicable to linear sensors.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is described and explained in more detail below using embodiments shown in the drawings. The described and drawn features can be used individually or in preferred combinations in other embodiments of the invention. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE PREFERRED EMBODIMENTS

Figure 1:
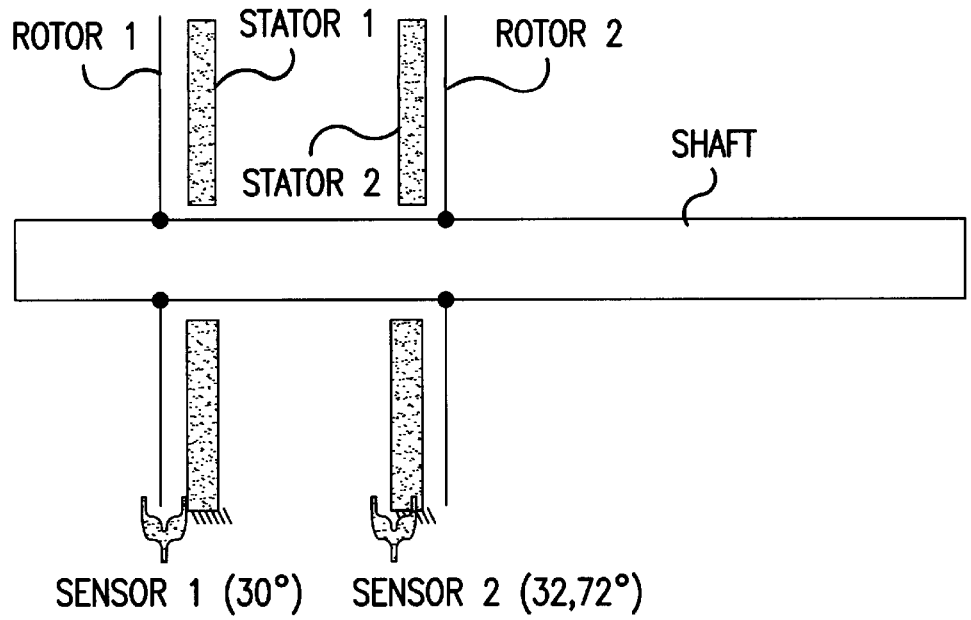
FIG. 1 illustrates a high-procisoin angle sensor according to the present invention.

The embodiment illustrated in FIG. 1 shows a high-precision angle sensor for 360° acquisition. As seen in the figure, sensor 1 has an angular periodicity of 30° (360°/12) and sensor 2 has an angular periodicity of 32.72° (360°/11).

An absolute angle between 0 and 360° can be calculated from the ratios of sensor signal 1 and sensor signal 2. The desired increase in accuracy results from the 30 angles, as described above, being acquired with a precision of 0.2 to 0.3%, but now an absolute angle of 360° can be acquired. Referenced to the 360° this yields a precision of 0.0167 to 0.025%.

It is quite expensive to construct two independent sensors, therefore, a simplified construction is desirable. For example, it would be advantageous if both stators (receiving geometries) could be combined in one plane. In this case, however, it is expected that the two magnetic fields of the two rotors (coupling elements) would mutually influence one another, which would lead to behavior of the sensors that may not be interpreted or may only be interpreted with difficulty. Nevertheless, experimentation with different geometries demonstrate that in spite of this it is still possible to obtain meaningful sensor behavior. This will be explained in the following.

Figure 2:
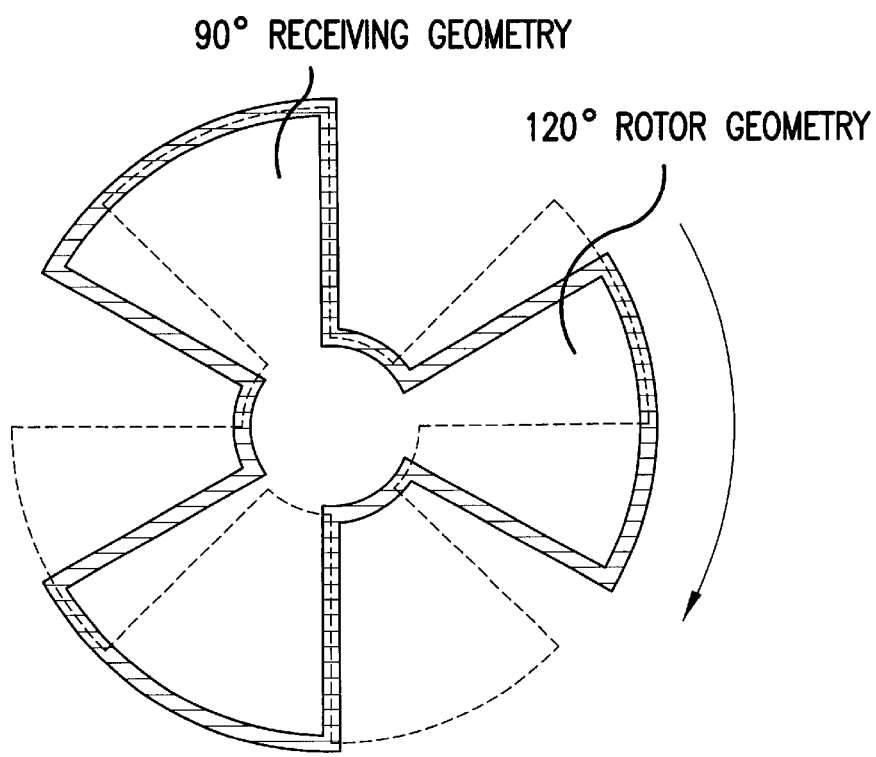
FIG. 2 illustrates an angle sensor having 90° receiving geometry being operated with a 120° rotor.

According to the present invention, as is illustrated in, FIG. 2, considered is a 90° receiving geometry that is operated with a 120° rotor.

The magnetic field induced by the rotor in the receiving coil leads to a signal voltage amplitude in the receiving coil that is proportional to the expression $\int B_r dA$ ($B_r$: Magnetic field strength induced by the rotor in the receiving coil; A: Surface area of the receiving coil). It can be demonstrated that this integral is approximately independent of the position of the rotor relative to the stator. In concrete terms this can be explained by noting that the positive components to be counted in the integral are equally as large as the negative components to be counted.

Similarly, a 120° receiving geometry operated with a 90° rotor leads to the same result. Since the superposition principle can be applied to the overlapping of magnetic fields, this means that it is possible to embed several sensor structures with different angles within one another.

Figure 3:
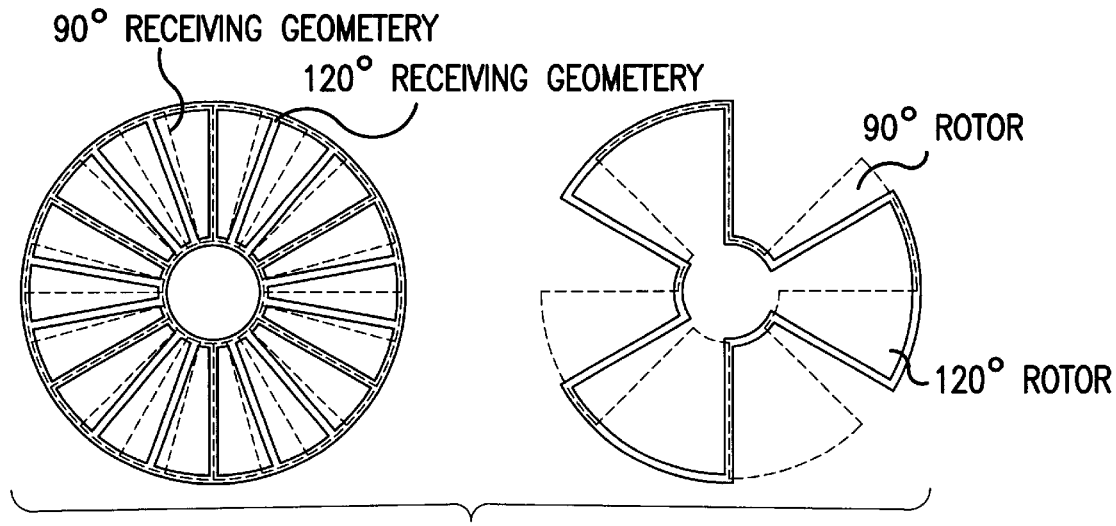
FIG. 3 illustrates an angle sensor having 120° receiving geometry being operated with a 90° rotor.

An example of such an arrangement is illustrated in FIG. 3. Implemented in the stator are two receiving coils with different angles (e.g. 120° and 90°). The rotor is constructed of two individual rotors (in this example 120° and 90°) which may lie directly above one another. Since, as explained above, the 120° rotor has no interference effect on the 90° receiving geometry, and the 90° rotor has no interference effect on the 120° receiving geometry, at the receiving coils we obtain two independent sets of angle information as required by the vernier principle. This makes it possible to construct a very simple sensor, which provides the desired results.

Figure 4:
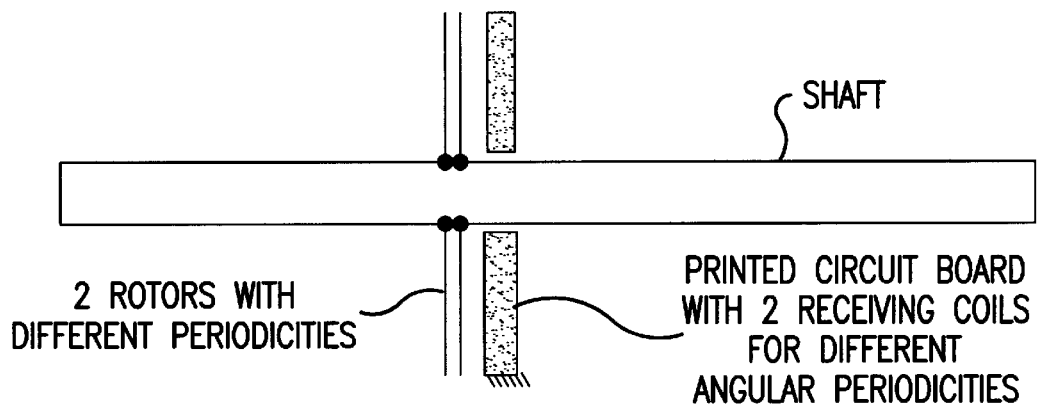
FIG. 4 illustrates an angle sensor being implemented in a motor vehicle.
Figure 5:
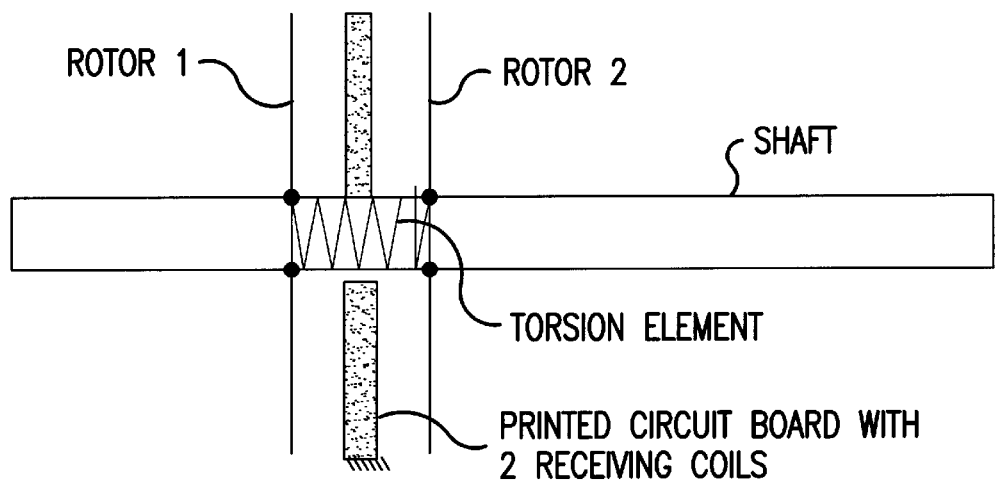
FIG. 5 illustrates an angle sensor being implemented in combination with a torsional element.

The following variants of the present invention are possible for different applications:

1. Acquisition of angles with a high degree of accuracy, e.g. for acquisition of the steering angle in a motor vehicle (see FIG. 4): Two sets of receiving coils with different angular periodicities are arranged approximately in one plane; two rotors with suitably different periodicities are located in a second plane.
2. Acquisition of angles with a high degree of accuracy and angles >360° (similarly suitable for steering angle acquisition): Two sets of receiving coils with different angular periodicities are located approximately in one plane; two rotors with different angular periodicities, one of which has a suitable gear ratio.
3. Acquisition of torque and use of a torsional element (see FIG. 5): Two receiving coils with different angular periodicities are arranged approximately in one plane, a rotor at one end of the torsional element, a second rotor at the opposite end of the torsional element. The torque can be acquired by means of a difference measurement.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Inductive position sensor for a motor vehicle, comprising:

an oscillator circuit that generates a periodic alternating voltage signal and couples it into an exciting coil;

several receiving coils each of which forms a periodically repeating loop winding structure and whose overall arrangement forms a receiving geometry;

an evaluation circuit for evaluating signals induced in the receiving coils; and a movable inductive coupling element which influences the strength of an inductive coupling between the exciting coil and the receiving coils, wherein the position sensor includes two receiving geometries and two coupling elements, the periodicity of the loop winding structures of the receiving coils is different in the two receiving geometries, and over a total measuring range of the position sensor the numbers of periodic repetitions in the loop winding structures of the receiving coils of the two receiving geometries exhibit a non-integer ratio in relation to one another.

2. Inductive position sensor as in claim 1, wherein the two coupling elements are arranged approximately in one plane.

3. Inductive position sensor as in claim 1, wherein the two receiving geometries are arranged substantially in one plane.

4. Inductive position sensor as in claim 3, wherein the coupling elements are arranged on opposite sides of the receiving geometries.

5. Inductive position sensor as in claim 1, wherein one of the coupling elements is driven by a gear unit.

6. Inductive position sensor as in claim 1, wherein the evaluation circuit evaluates information of the individual sets of receiving coils for the purpose of plausibility checking.

* * * * *